(12) United States Patent
Petricci et al.

(10) Patent No.: US 7,803,284 B2
(45) Date of Patent: Sep. 28, 2010

(54) HEAT TRANSFER FLUIDS

(75) Inventors: Silvia Petricci, Milan (IT); Pier Antonio Guarda, Milan (IT); Giuseppe Marchionni, Milan (IT)

(73) Assignee: Solvay Solexis S.p.A., Milan (IT)

( * ) Notice: Subject to any disclaimer, the term of this patent is extended or adjusted under 35 U.S.C. 154(b) by 59 days.

(21) Appl. No.: 12/281,200

(22) PCT Filed: Feb. 22, 2007

(86) PCT No.: PCT/EP2007/051707

§ 371 (c)(1), (2), (4) Date: Aug. 29, 2008

(87) PCT Pub. No.: WO2007/099055

PCT Pub. Date: Sep. 7, 2007

(65) Prior Publication Data

US 2009/0008596 A1 Jan. 8, 2009

(30) Foreign Application Priority Data

Mar. 2, 2006 (IT) .......................... MI2006A0381

(51) Int. Cl.
*C09K 5/00* (2006.01)
*F28D 21/00* (2006.01)

(52) U.S. Cl. .......................... 252/78.1; 252/73; 252/77; 165/186; 165/104.19; 165/104.33

(58) Field of Classification Search ................ 252/78.1, 252/73, 77; 165/186, 104.19, 104.33
See application file for complete search history.

(56) References Cited

U.S. PATENT DOCUMENTS

| 6,083,600 | A | 7/2000 | Kasai et al. |
| 6,303,080 | B1 | 10/2001 | Tuma |
| 6,374,907 | B1 | 4/2002 | Tousignant |
| 6,869,920 | B2 * | 3/2005 | Marchionni et al. ......... 508/582 |
| 7,651,627 | B2 * | 1/2010 | Costello et al. ............... 252/68 |
| 2003/0130143 | A1 * | 7/2003 | Marchionni et al. ......... 508/582 |
| 2003/0196727 | A1 | 10/2003 | Maccone |
| 2004/0235685 | A1 | 11/2004 | Russo et al. |
| 2005/0126756 | A1 | 6/2005 | Costello |

FOREIGN PATENT DOCUMENTS

| EP | 1 275 678 A2 | 1/2003 |
| EP | 1 354 932 A1 | 10/2003 |
| WO | WO 2005-007771 A | 1/2005 |

* cited by examiner

*Primary Examiner*—Douglas Mc Ginty
(74) *Attorney, Agent, or Firm*—Arent Fox LLP

(57) ABSTRACT

Heat transfer fluids are used in the presence of metals and/or Lewis acids of mixtures. The heat transfer fluids comprise (A) hydrofluoroethers and/or hydrofluoropolyethers, liquid under the environmental conditions (25° C., 1 atm); and (B) a compound having a fluoropolyether structure having end groups selected from the pyridine, amine, and aryl classes. The heat transfer fluids have a number average molecular weight of between 400 and 10,000.

20 Claims, No Drawings

HEAT TRANSFER FLUIDS

The present invention relates to hydrofluoroether and/or hydrofluoropolyether fluids as heat transfer having an improved stability in the presence of metals and/or Lewis acids.

More specifically the invention relates to fluids comprising hydrofluoroethers and/or hydrofluoropolyethers in admixture with partially fluorinated compounds, having an improved stability in the presence of metals and/or Lewis acids, in particular at temperatures higher than 200° C. Besides the present invention relates to the use of said mixtures as heat transfer fluids both at high and low temperatures, in particular in primary and secondary heat transfer circuits.

It is known to use perfluoropolyethers or perfluorocarbons (FC) as heat transfer fluids for their high chemical inertia, their non flammability and for the fact that they are liquid in a wide of temperatures, for example from −120° C. to +250° C.

However, as known, the perfluoropolyethers and the perfluorocarbons show a high Global Warming Potential (GWP), even though they have an ODP (Ozone Depletion Potential) equal to zero. In order to reduce the GWP, partially hydrogenated fluorocarbon fluids have been developed in the last years, i.e. hydrofluorocarbons (HFC), as they have a low GWP. However these fluids have a narrow application temperature range due to their low boiling point. High pressures are required for their use in liquid form. Hydrofluorocarbons (HFC) having higher boiling points are difficult to be used at low temperature owing to their high viscosities.

Other fluids known in the prior art having hydrogen atoms in the molecule are hydrofluoro(poly)ethers: the hydrogen in the molecule reduces the life time (then the GWP) in comparison with the corresponding perfluorinated products. Examples of these fluids are hydrofluoroethers HFE, for example $C_4F_9O$—$CH_3$ (HFE® 7100), $C_4F_9O$—$C_2H_5$ (HFE® 7200), $C_2F_5CF(OCH_3)CF(CF_3)_2$ (HFE® 7300) and $C_3F_7CF(OC_2H_5)CF(CF_3)_2$ (HFE® 7500), which show a GWP comprised between 50 and 300.

Other known fluids are hydrofluoropolyethers commercialized by Solvay Solexis as H-Galden® ZT having general formula:

$$HCF_2O(CF_2O)_a(CF_2CF_2O)_bCF_2H,$$

for example H-Galden® ZT 85, ZT 130, ZT 150, ZT 180 (see the article "Hydrofluoropolyethers" published on Journal Fluorine Chemistry, 95 (1999), pages 41-50, by Marchionni et al.).

A further class of hydrofluoropolyethers having a lower GWP, generally lower than 300, are those having general formula $$R_hO(CF_2O)_a(CF_2CF_2O)_bR_h$$

with $R_h$=—$CH_3$, —$C_2H_5$.

Hydrofluoropolyether fluids show heat transfer properties comparable with those of perfluorinated compounds and hydrofluorocarbons, have a very low viscosity variation with the temperature. These features render those fluids particularly suitable to be used in applications requiring the heat transfer at high and low temperature.

Hydrofluoro(poly)ethers are usually employed in a temperature range comprised between their pour point and their boiling point. A larger range of temperature can be used when one operates under pressure. Further the hydrofluoro(poly)ethers show a good heat transfer fluid, in particular a high specific heat, low viscosity variation, low toxicity, low flammability, good dielectric properties, high chemical inertia.

However in the presence of metals and/or Lewis acids they present the drawback that they decompose generating acid, flammable and toxic by-products. In addition the hydrofluoropolyethers and hydrofluoroethers show a lower stability in comparison with the corresponding perfluoro(poly)ethers at the same temperature in the presence of metals and/or Lewis acids. This brings to a narrow temperature range of hydrofluoropolyethers. For example, the hydrofluoroethers having the —$OCH_3$, —$OC_2H_5$ group, commercially known as HFE, show a liquid limit temperature near to their boiling temperatures, and anyway lower than 150° C. As a matter of fact, these products, in particular HFE® 7200 ($C_4F_9OC_2H_5$) and HFE® 7500 ($C_7F_{15}OC_2H_5$), at this maximum use temperatures (i.e. 150° C.) degrade into toxic by-products, respectively $C_3F_7COF$, $C_3F_7C(O)C_3F_7$ and fluoroalkane of formula $C_2H_5F$, the latter being also flammable. See the article published in the Journal Fluorine Chemistry, 2004, vol. 125, "The comparison of thermal stability of some hydrofluoro compounds", by Marchionni et al., pages 1081-1086. Hydrofluoroplyethers having —$OCH_3$, —$OC_2H_5$, —$OCF_2H$ as end groups show a use limit temperature near 200° C.

The Lewis acids which can be mentioned are the metal halides, in particular for example $TiX_3$, $AlX_3$, $CrX_3$, $MnX_3$, etc., wherein X is an halogen selected from fluorine, chlorine and bromine. Most of these metals are the components of steel. The latter, as known, forms the heat exchange circuits. The metal surfaces in contact with hydrofluoro(poly)ether fluids can form in the time metal fluorides on the surface, especially in the case of hydrofluoroethers, when the temperature is approaching the boiling temperature of the fluids, or, in the case of hydrofluoropolyethers, when the temperature is higher than about 180° C. The above metal fluorides cause the fluid degradation through catalytic cracking reactions generating acid by-products, even gaseous, which bring to fluid loss and variations of the initial fluid characteristics causing performance loss. Furthermore in the presence of humidity, even in traces, the degradation by-products containing —COF end groups give rise to the corresponding carboxylic acids and HF, thus causing metal corrosion problems and environmental impact owing to their toxicity.

In some cases the fluid can be subjected to remarkable temperature ranges from very high to very low temperatures in the loop circuit.

For example, in the thermal shock test only one working fluid is used for the bath at −65° C. and for that at 200° C. See for example the U.S. Pat. No. 4,995,726.

Another example is that of processes at low temperature, such as dehydration, chemical reactions, biological reactions which take place in a temperature range −80/0° C. in a reactor which is subsequently subjected to sterilization at high temperature, in general of at least 130° C. In these applications the heat transfer fluid must work in a temperature range between −80° C. and at least 130° C. and must maintain its performances unchanged in said range. See for example WO 01/27216.

A further example can be represented by photochemical processes at low temperatures, lower than −20° C. down to −100° C., wherein the radiation source generally having a wall temperature between 300° C. and 800° C., is normally cooled by a secondary heat transfer fluid. In general the latter circuit which then is brought to the required temperature, lower than −20° C., by means of a primary heat exchanger. As example photochemical synthesis of the peroxidic perfluoropolyethers can be cited.

The need was felt to have available heat transfer fluids having the following combination of properties:

low GWP, stability in the presence of metals and/or Lewis acids, good heat transfer properties in a wide temperature range, both at high and low, chemico-physical stability when subjected to wide temperature ranges, for example from −120° C. to +250° C., maintaining unchanged in the time the initial performances.

It has now been surprisingly and unexpectedly found fluids solving the above technical problem.

It is an object of the present invention the use as heat transfer fluid in the presence of metals and/or Lewis acids of mixtures comprising:

(A) hydrofluoroethers and/or hydrofluoropolyethers, liquid under environmental conditions (25° C., 1 atm);

(B) a compound having a fluoropolyether structure comprising one or more repeating units selected from (CFXO), $(CF_2CF_2O)$, $(CF_2CF_2CF_2O)$, $(CF_2CF_2CF_2CF_2O)$, $(CR_5R_6CF_2CF_2O)$, $(CF(CF_3)CF_2O)$, $(CF_2CF(CF_3)O)$, wherein X=F, $CF_3$; $R_5$ and $R_6$, equal to or different from each other, are selected from H, Cl, perfluoroalkyl from 1 to 4 carbon atoms; and having end groups selected from the pyridine, amine, aryl classes; and having a number average molecular weight in the range 400-10,000, preferably 800-5,000.

The compounds (A) have a number average molecular weight in the range 120-5,000, preferably 180-2,000, more preferably 300-1,500.

The hydrofluoropolyethers of the class (A) comprise oxyfluoroalkylene units selected from $—(CF_2O)—$, $—(CF_2CF_2O)—$, $—(CF_2(CF_2)_cO)—$, wherein c=2, 3, statistically distributed in the polymeric backbone.

Preferably the hydrofluoropolyethers of class (A) are the following:

$$T_1O—(CF_2O)_a—(CF_2CF_2O)_b—(CF_2(CF_2)_cO)_d-T_2 \quad (I)$$

wherein:

c is 2 or 3; the coefficients a, b, d are integers, zero included, and are such that the number average molecular weight is in the range 120-5,000, preferably 180-2,000; $T_1$, $T_2$, equal or different from each other, are selected from $—CF_2H$, $—CF_2CF_2H$, $—CH_3$, $—C_2H_5$, $—C_3H_7$. Particularly preferred compounds are those wherein d=0 having formula:

$$T_1O—(CF_2CF_2O)_b—(CF_2O)_a-T_2 \quad (II)$$

wherein:

$T_1$, $T_2$=$—CF_2H$ or $T_1$, $T_2$=$—CH_3$; a, b are as defined in formula (I).

Hydrofluoroethers are selected from the following:

$$R_1—O—R_2 \quad (III)$$

wherein $R_1$, $R_2$, equal to or different from each other, comprise together at least 3 carbon atoms and the total number of hydrogen atoms is equal at most to the number of the fluorine atoms. Specific examples are $C_3F_7—OCH_3$, $C_4F_9—OCH_3$, $C_4F_9—O—C_2H_5$, $C_7F_{15}—O—C_2H_5$, $C_4F_9—OCF_2H$, $C_4F_9—OCF_2CF_2H$, $C_6F_{13}—O—CH_3$;

$$R_f—O—R_h—O—R_f \quad (IV)$$

wherein:

$R_f$, $R_{f'}$ are independently a perfluoroaliphatic, fluoroaliphatic group wherein $R_{f'}$ $R_{f'}$ contain at least one hydrogen atom;

$R_h$ is independently a linear, branched or cyclic alkylene group having from 2 to 8 carbon atoms and at least 4 hydrogen atoms. Specific examples are:

$CF_3CFHCF_2OC_2H_4OCF_2CFHCF_3$;
$C_3F_7OCFHCF_2OC_2H_4OCF_2CFHOC_3F_7$;
$CF_3OCFHCF_2OC_2H_4OCF_2CFHOCF_3$;
$CF_3CFHCF_2OC_3H_6OCF_2CFHCF_3$;
$CF_3OCFHCF_2OC_2H_4OCF_2CFHOCF_3$;
$C_3F_7OCFHCF_2OC_2H_4OCF_2CFHCF_3$;
$CF_3CFHCF_2OCH_2C_3F_6CH_2OCF_2CFHCF_3$;
$CF_3CF_2CF_2OCH_2CH_2CH_2OCF_2CF_2CF_3$;
$CF_3CF_2CF_2CF_2OCH_2CH_2CH_2OCF_2CF_2CF_2CF_3$;
$CF_3CF_2CF_2OCH_2CH_2OCF_2CF_2CF_3$;
$CF_3CF_2CF_2CF_2CF_2OCH_2CH_2CH_2OCF_2CF_2CF_2CF_3$;
$CF_3CF_2CF[CF(CF_3)_2]OCH_2CH_2CH_2OCF[CF(CF_3)_2]CF_2CF_3$;
$CF_3CF_2CF_2CF_2OCH_2CH_2CH_2CH_2OCF_2CF_2CF_3$;
$C_4F_9OC_3H_6OC_4F_9$ (mixtures of inseparable isomers of n-$C_4F_9$ and i-$C_4F_9$);
$C_4F_9OC_4H_8OC_4F_9$ (mixtures of inseparable isomers of n-$C_4F_9$ and i-$C_4F_9$);
$CF_3CF_2CF_2CF_2OCH_2CH_2OCF_2CF_2CF_2CF_3$;
$CF_3CF_2CF_2CF_2OCH_2CH_2OCH_2CH_2OCF_2CF_2CF_2CF_3$;
$CF_3OCF_2CF_2CF_2OCH_2CH_2OCF_2CF_2CF_2OCF_3$.

The isomers having a $(C_2F_5)(CF_3CFH)CFOC_2H_4OCF(CFHCF_3)(C_2F_5)$ structure and their mixtures can be mentioned.

The hydrofluoropolyethers of class (A) of formula (I) are known for example from EP 695,775, herein incorporated by reference. The formula (I) compounds containing $—CH_3$, $—C_2H_5$ end groups can be prepared for example by reaction of the corresponding perfluoropolyethers having $—COF$ end groups with an alkaline metal fluoride (M) to give the corresponding alcoholates having $—CF_2OM$ end groups, which are reacted with methyl- or ethyl-sulphite, as described in patent application EP 1,275,678, herein incorporated by reference.

The hydrofluoroethers of formula (III) are known for example from U.S. Pat. No. 5,713,211, herein incorporated by reference.

The hydrofluoroethers of formula (IV) are known for example from US patent applications US 2005/126,756 and US 2005/127,322, herein incorporated by reference.

Component (A) can be used in admixture with one or more perfluoropolyethers having a number average molecular weight in the range 300-1,550 and viscosity at 20° C. lower than 20 cSt. The perfluoropolyethers are preferably selected from liquid perfluoropolyethers having perfluorinated end groups of formula (V):

$$T'_1O—(CF_2CF(CF_3)O)_{a'}—(CF(CF_3)O)_{b'}—(CF_2CF_2O)_{d'}—(CF_2O)_{e'}-T'_2 \quad (V)$$

wherein:

$T'_1$, $T'_2$, equal to or different from each other, are selected from $—CF_2X_1$ ($X_1$=$—F$. $—CF_3$,), $—C_3F_7$; a', b', d', e' are integers, zero comprised, such that the number average molecular weight of the compound (V) is comprised between 300 and 1,550 and having viscosity at 20° C. lower than 20 cSt. These compounds are known and commercialized as Galden® HT. The perfluoropolyethers are used in amounts comprised between 10% and 90% by weight with respect to the total composition, preferably between 10% and 60%, more preferably between 15% and 40%.

The end groups of compound (B), as said, are selected from the pyridine, amine, aryl classes, the latter being optionally substituted as described herebelow.

Compounds (B) are preferably selected from the following classes:

(a) 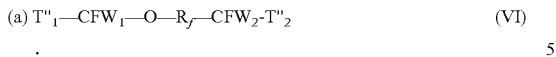 (VI)

wherein:

$T''_1$, $T''_2$, equal to or different from each other, have the following meanings:

F, $CF_3$, $C_2F_5$, $(C_2F_4)Cl$;

$CH_2$—B—Y, $CH(CF_3)O$—Y, wherein:
B=O, S;

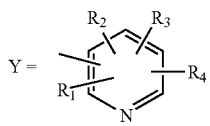

wherein $R_1$, $R_2$, $R_3$, $R_4$, equal to or different from each other, are H, F, linear or branched $C_1$-$C_8$ perfluoroalkyl, $NO_2$, CN, preferably H and/or linear or branched $C_1$-$C_8$ perfluoroalkyl;

with the proviso that at least one of the end groups $T''_1$, $T''_2$ is $CH_2$—B—Y or $CH(CF_3)O$—Y as defined above;

$W_1$, $W_2$, equal to or different from each other, are —F, —$CF_3$; $R_f$ is a (per)fluoropolyoxyalkylene chain comprising one or more repeating units, statistically distributed in the chain, having the following structures: (CFXO), ($CF_2CF_2O$), ($CF_2CF_2CF_2O$), ($CF_2CF_2CF_2CF_2O$), ($CR_5R_6CF_2CF_2O$), ($CF(CF_3)CF_2O$), ($CF_2CF(CF_3)O$), wherein X=F, $CF_3$; $R_5$ and $R_6$, equal to or different from each other, are selected from H, Cl, perfluoroalkyl from 1 to 4 carbon atoms; the number average molecular weight of $R_f$ being from 400 to 10,000, preferably from 800 to 5,000.

(b) $NR_1R_2$—$CH_2$—$CF_2O$—$R_F$—$CF_2$—$CH_2NR_1R_2$ (VII)

wherein:

$R_1$, $R_2$, equal to or different from each other, are selected from H, a $C_1$-$C_{12}$ alkyl chain, $C_3$-$C_{12}$cycloaliphatic, preferably $C_5$-$C_{10}$, or arylic chain containing up to 12 carbon atoms, with the proviso that $R_1$, $R_2$ are not both H;

$R_F$ is a perfluoropolyoxyalkylene chain defined as the $R_f$ chain of the class (a).

(c)

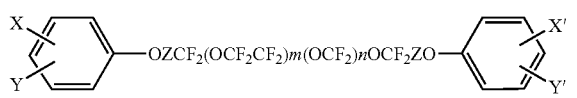 (VIII)

wherein:

X, Y, X', Y', equal or different, are, independently the one from the other, selected from H, $NO_2$, $C_1$-$C_4$ alkyl, $C_1$-$C_4$ alkoxyl, preferably methoxyl;

Z=—$CH_2$—; >C=O (carbonyl);

m and n are integers such that m is comprised between 0 and 80, extremes included; n is comprised between 0 and 20, extremes included; m+n preferably being >1;

the number average molecular weight being in the range 500-10,000, preferably 1,000-4,000.

The (per)fluoropolyether chain $R_f$ of the formula (VI) of class a) is preferably selected from the following structures:

—$(CF_2CF(CF_3)O)_a(CFXO)_b$— (i)

or $(CF_2CF(CF_3)O)_a(CFXO)_bCF_2(R'_f)CF_2O(CF_2CF(CF_3)O)_a(CFXO)_b$ wherein $R'_f$ is a perfluoroalkylene group from 1 to 4 C atoms; X is F or $CF_3$; a and b are integers, zero included, such that the number average molecular weight is in the above range, with the proviso that at least one of the a or b indexes is different from zero;

—$(CF_2CF_2O)_c(CF_2O)_d(CF_2(CF_2)_zO)_h$— (ii)

wherein c, d and h are integers, zero included, such that the number average molecular weight is in the above mentioned range, with the proviso that at least one of c, d, h indexes is different from zero; z is 2 or 3;

—$(CF_2CF(CF_3)O)_e(CF_2CF_2O)_f(CFXO)_g$— (iii)

wherein X is F or $CF_3$; e, f, g are integers, zero included, such that the number average molecular weight is in the above range, with the proviso that at least one of e, f, g indexes is different from zero;

—$(CF_2(CF_2)_zO)_s$— (iv)

wherein s is an integer such as to give the above molecular weight, z has the already defined meaning;

—$(CR_5R_6CF_2CF_2O)_{j'}$— (v)

or

—$(CR_5R_6CF_2CF_2O)_{p'}$—$R'_f$—O—$(CR_5R_6CF_2CF_2O)_{q'}$— wherein $R_5$ and $R_6$ are equal to or different from each other and selected from H, Cl or perfluoroalkyl from 1 to 4 C atoms; $R'_f$ is a fluoroalkylene group from 1 to 4 C atoms; j', p' and q' are integers such as to have a molecular weight as that indicated above;

—$(CF(CF_3)CF_2O)_j$ (vi)

or

—$(CF(CF_3)CF_2O)_k$—$R'_f$—O—$(CF(CF_3)CF_2O)_{j''}$— wherein $R'_f$ is a fluoroalkylene group from 1 to 4 C atoms; j, k, j" being integers such as to give the above molecular weight.

Preferably $R_f$ in the formula (VI) of the class (a) is selected from (i) and (ii). The preferred compounds of formula (VI) are those wherein the (per)fluoropolyether chain is linked by an ether bond to the carbon atom in alpha position with respect to the nitrogen atom of the pyridine ring Y.

The preferred compound of class (a) is the following of formula (VIii)

The compounds of the class (a) can also be used in admixture. The compounds of class (a) are known and can be prepared according to, for example, US 2004/235,685, herein incorporated by reference.

The preferred compounds of formula (VII) of class (b) have as end groups tertiary amine wherein $R_1$, $R_2$ are $C_1$-$C_6$ aliphatic groups. The compound of formula

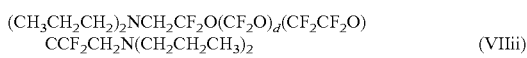
(VIIii)

is still more preferable.

The compounds of class (b) can also be used in admixture. These compounds are known as lubricants for magnetic discs and can be prepared, for example, according to U.S. Pat. No. 6,083,600, herein incorporated by reference.

The compounds of class (c) can also be used in admixture. The preferred compounds have formula (VIIIc)

wherein m is comprised between 0 and 80, extremes included; n is comprised between 0 and 20, extremes included, m/n preferably being from 0.5 to 4 and m+n is such to give the above mentioned molecular weight, n being different from zero.

The compounds of class (c) are known and can be prepared for example according to US 2003/196,727, EP 1,354,932, herein incorporated by reference.

Mixtures of compounds of the classes (a), (b), (c) can also be used.

The preferred components (B) are those of the classes (a) and (b) as they show a wider temperature application range, in particular at low temperatures.

In case component (B) belongs to class (c), component (A) is preferably a hydrofluoropolyethers having terminal end groups, equal or different, selected from —$CH_3$ and —$C_2H_5$.

The compositions of the present invention are heat transfer fluids suitable to be used for applications wherein the fluid is subjected to a wide temperature ranges by passing from high to low temperatures, for example in the thermal shock test, processes at low temperatures requiring a sterilization step, lyophilization processes, vapor phase soldering, etc. Tests carried out by the Applicant have shown that the compositions of the invention are chemically and physically stable in a broad temperature range between −100° C. and +250° C. without degradation or separation of the components.

In particular the compounds of classes (a) and (b) unexpectedly and surprisingly are fully soluble in hydrofluoro (poly)ethers (A) also at low temperatures, even lower than −50° C. This fact is surprising and unexpected as mixtures of two chemically different components show a poor solubility when the temperature decreases, in particular at temperatures lower than zero.

The compounds of class (c) are soluble till 0° C. when the hydrofluoropolyethers have —$CF_2H$ as end groups and till −15° C. in the hydrofluoropolyethers having terminal end groups selected from —$CH_3$, —$C_2H_5$.

Therefore the choice of component (B) depends on the operating temperature range of the fluid.

The compositions of the present invention are particularly advantageous as their performances, i.e. the heat transfer, remain substantially unchanged for a long time, even when subjected to frequent temperature ranges from −140° C. to +250° C., preferably from −120° C. and to +200° C. and also in the presence of Lewis acids.

The compositions of the compounds of the present invention can be stored for long periods, i.e. they show high shelf-life, also in cool environments without phase separation. Thus they are ready-to-use at any time.

Component (B) preferably ranges up to 30% by weight, more preferably from 0.01-10%, still more preferably from 0.05-5% by weight with respect to the total composition.

The heat transfer fluids obtainable by the compositions of the present invention represent a further object of the present invention. They are stable in a wide temperature range, preferably comprised between −140° C. and 250° C., in the presence of metals and/or Lewis acids. Preferably in these compositions the component (B) is selected from the compounds of the classes (a) and (b).

It was further found that the compositions of the present invention are usable also as solvent to remove polluting agents and/or water, i.e. in the cleaning of mechanical and/or electronic components. The cleaning can also be carried out in the presence of ozone. Another use of the compositions of the present invention is in the etching applications for semiconductors or integrated circuits, including silicon and Ga/As substrata. See, for instance, patent application EP 1,268,734.

Some illustrative Examples but not limitative of the present invention follow.

EXAMPLES

Characterization

Stability

It has been evaluated by the resistance test to Lewis acids by using $AlF_3$ in powder as Lewis acid, generally used for accelerated tests of fluoropolyether fluid degradation. Said Lewis acid is anhydrified by heating before being used. The test temperature is that near the boiling temperature of the hydrofluoro(poly)ether or of its mixtures with perfluoropolyethers.

Determination Functional End Groups

It is carried out by $^{19}F$-NMR analysis by using a NMR Varian Mercury 400 spectrometer working at 376 MHz frequency. By functional type end groups, carboxylic acids, acylfluorides, fluoroformates and ketones are meant.

The sensitivity limit for these functional derivatives is equal to 5 meq/Kg (but are detectable up to 2 meq/Kg maintaining an acceptable error).

Determination of the Acidity

It is determined by potentiometric analysis and carried out with Mettler Toledo DL 55 titrer equipped with DG 115-SC type electrode, by using the solvent mixture water-acetone 15/30 and triethylamine 0.02 M as titrant.

Then it has been verified that the acidity determination (carboxylic acid end groups and HF) by potentiometric analysis is not altered or influenced by the presence of the compounds B) also in concentration equal to 3%. Besides also the sensitivity limit does not result influenced and is equal to 1 meq/Kg.

The acidity is a degradation index of the fluoropolyether compound due to the presence of metals and/or Lewis acids.

Test with Lewis Acids

Example 1

Mixture H-Galden® ZT 180/Compound (VIii)

50.0 grams of an hydrofluoropolyether of formula $HF_2CO(CF_2O)_m(CF_2CF_2O)_nCF_2H$ having a number average molecular weight determined by $^{19}F$-NMR analysis equal to 640, m=1.88; n=3.44 and a boiling point of 178° C., commercially known as H-Galden® ZT 180, are placed in a glass flask equipped with magnetic stirrer, thermocouple for the temperature determination and water cooled bubble condenser, and then they are added with 1.5 g of a compound having a number average molecular weight of 2,300 and of formula (VIii)

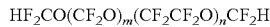

wherein d=9.46; c=10.41;

and with 0.25 g of aluminum trifluoride previously anhydrified by temperature treatment, even in the presence of Lewis acids.

The flask is immersed in a heating bath, brought to the temperature of 170° C. under stirring and maintained at this temperature for 4 hours. The fluid temperature inside the flask remains constant for the whole duration of the test and equal to 168° C.

At the end of the test the resulting mixture is weighed obtaining 51.05 g, corresponding to 49.3 g of residual HFPE fluid (1.4% of weight loss).

The mixture is centrifuged to separate the solid aluminum trifluoride and the supernatant fluid to be subjected to $^{19}F$-NMR analysis.

It results a number average molecular weight unaltered with respect to initial one and no end groups of acid type are observed. The acid end groups are an index of the perfluoropolyether chain decomposition.

The potentiometric titration does not point out the presence of acidity.

Example 2

Mixture H-Galden® ZT 180/Compound (VIIii)

The same procedure and the same reactants of the Example 1 are used except that 1.5 g of the compound of formula (VIIii)

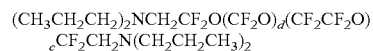

wherein d=10.04; c=10.54;

having a number average molecular weight of 2,230, are used in replacement of the compound of formula (VIii).

At the end of the test the resulting mixture is weighed obtaining 51.05 g, corresponding to 49.3 g of residual hydrofluoropolyether (HFPE) fluid (1.4% of weight loss).

The mixture is centrifuged to separate the solid aluminum trifluoride and the supernatant fluid to be subjected to $^{19}F$-NMR analysis.

It results a number average molecular weight unaltered with respect to the initial one and no end groups of acid type are observed.

The potentiometric titration does not point out the presence of acidity.

Example 3

Mixture H-Galden® ZT 180/Compound (VIIIc)

The same procedure and the same reactants of the Example 1 are used, but in the presence of 1.5 g of a compound of formula (VIIIc)

wherein m=9.92; n=10.44;

having a number average molecular weight of 2,350, in place of the compound of formula (VIii).

At the end of the test the resulting mixture is weighed obtaining 51.15 g, corresponding to 49.4 g of residual HFPE fluid (1.2% of weight loss).

The mixture is centrifuged to separate the solid aluminum trifluoride and the supernatant fluid to be subjected to NMR analysis.

It results a number average molecular weight unaltered with respect to the initial one and no end groups of acid type are observed.

The potentiometric titration does not point out the acidity presence.

Example 4

Comparative

The Example 1 was repeated, but in the absence of the component (B) and of aluminum trifluoride.

At the end of the test 49.2 g of residual HFPE are weighed corresponding to a weight loss of 1.6%.

By the NMR analysis no variation of average molecular weight and no presence of acid end groups are observed.

The potentiometric titration does not show the presence of acidity.

It is noticed that the weight loss values of the hydrofluoropolyether (A) added with the component (B) of the Examples 1, 2 and 3 (tests carried out in the presence of Lewis acids) substantially are comparable with the weight loss by evaporation of the same unadditioned hydrofluoropolyether and in the absence of Lewis acids of Example 4.

This shows that the weight losses of Examples 1, 2 and 3 are only due to the loss by evaporation of the lighter hydrofluoropolyether fractions.

Example 4a

Comparative

The Example 1 was repeated in the presence of Lewis acid but in the absence of the component (B).

After two hours of treatment, the fluid temperature inside the flask decreases to 167° C.

At the end of the test (4 hours) the resulting mixture is weighed obtaining 47.65 g, corresponding to 47.4 g of residual HFPE fluid (5.2% of weight loss).

The mixture is centrifuged to separate the solid aluminum trifluoride and the supernatant fluid to be subjected to NMR analysis.

It results a number average molecular weight equal to 620 and it is observed the presence of acid end groups of acylfluoride (—OCF$_2$COF) type and of fluoroformate (—OCOF) type, for a total of 240 meq of acid end groups for Kg of fluid.

The potentiometric analysis shows the presence of 226 meq/Kg of carboxylic acid end groups (—OCF$_2$COOH) and 846 meq/Kg of HF.

The formation of acid end groups and the high acidity values measured together with the weight loss show the product degradation due to the presence of the Lewis acid, when the component (B) is not present.

Example 5

Mixture HFE™-7500/Compound (VIii)

50.0 grams of hydrofluoroether of formula

$C_3F_7CF(OC_2H_5)CF(CF_3)_2$ having a molecular weight of 414 and a boiling point of 128° C., GWP=90, commercially known as HFE™-7500, are placed in a glass flask equipped with magnetic stirrer, thermocouple for the temperature determination and bubble condenser, and then they are added with 1.5 g of the compound of formula (VIii) of Example 1 and with 2.5 g of aluminum trifluoride previously anhydrified by treatment in temperature.

The flask is dipped in a heating bath maintained at the temperature of 135° C. for 18 hours. The fluid temperature under reflux in the flask remains constant at 128° C. for the whole duration of the test; said temperature corresponds to the boiling point of the HFE™-7500 at room pressure.

At the end of the test the resulting mixture is weighed obtaining 51.5 g, corresponding to 47.5 g of residual HFE fluid (5.0% of weight loss).

The mixture is centrifuged to separate the solid aluminum trifluoride and the supernatant fluid subjected to $^{19}$F-NMR analysis. The product results unaltered from the structural point of view.

Example 6

Comparative

The Example 5 was repeated but in the absence of component (B) and of aluminum trifluoride. At the end of the test a weight loss of 5.2% is determined. By the $^{19}$F-NMR analysis no variation of average molecular weight and no presence of acid end groups are observed.

It is observed that the weight loss value of the Example 5 (test carried out in the presence of Lewis acid) substantially is comparable with that of the Example 6: thus the weight loss of the Example 5 is only due to the loss by evaporation.

Example 6a

Comparative

The Example 5 was repeated but in the absence of component (B).

During the test a progressive decrease of the fluid temperature measured inside the flask, from 128° C. to 122° C. after 18 hours, is observed.

At the end of the test the resulting mixture is weighed obtaining 46.5 g, corresponding to 44.0 g of residual fluid (12% of weight loss).

The mixture is centrifuged to separate the solid aluminum trifluoride and the supernatant fluid subjected to $^{19}$F-NMR analysis. It is observed the presence of ketone having structure:

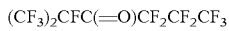

$(CF_3)_2CFC(=O)CF_2CF_2CF_3$ in an amount equal to 5.7% by moles.

The ketone formation together with the measured weight loss show the product degradation due to the presence of the Lewis acid, when the component (B) is not present.

Furthermore traces of ethylene and $SiF_4$ originated by the decomposition respectively of the fluoroethane $C_2H_5F$ and by the reaction of HF with the glass of the flask have been found. The fluorethane is, together with ketone, the decomposition product of HFE™-7500 under the test conditions.

Example 7

Mixture H-Galden® ZT 180/Galden® HT 170 60/40 in Admixture with the Component (VIii)

50.0 grams of a mixture 60/40 of commercial HFPE H-Galden® ZT 180 and commercial PFPE Galden® HT 170, having a molecular weight of 760, a viscosity of 1.8 cSt and a boiling point of 170° C., are placed in a glass flask equipped with magnetic stirrer, thermocouple for the temperature determination and water cooled bubble condenser, and then they are added with 1.5 g of the compound of formula (VIii) of Example 1 and with 0.25 g of aluminum trifluoride previously anhydrified by temperature treatment.

The flask is dipped in a heating bath, brought to the temperature of 170° C. under stirring and maintained for 4 hours at this temperature. The fluid temperature inside the flask remains constant for the whole duration of the test and is equal to 168° C.

The weight loss is equal to 1.4%. This value, comparable with that of the Example 1, shows that the perfluoropolyether does not alter the hydrofluoropolyether behaviour.

The mixture is centrifuged to separate the solid aluminum trifluoride and the supernatant fluid to be subjected to $^{19}$F-NMR analysis. No formation of acid type end groups is observed. The potentiometric titration does not show the presence of acidity.

Example 8

Mixture H-Galden® ZT 180/Galden® HT 170 40/60 in Admixture with the Component (VIii)

50.0 grams of a mixture 40/60 of commercial HFPE H-Galden® ZT 180 and commercial PFPE Galden® HT 170 are placed in a glass flask equipped with magnetic stirrer, thermocouple for the temperature determination and water cooled bubble condenser, and then they are added with 1.5 g of the compound of formula (VIii) of Example 1 and with 0.25 g of aluminum trifluoride previously anhydrified by treatment in temperature.

The flask is dipped in a heating bath, brought to the temperature of 170° C. under stirring and maintained for 4 hours at this temperature. The fluid temperature measured inside the flask remains constant for the whole duration of the test and is equal to 167° C.

The weight loss is equal to 1.4%. This value, comparable with that of the Example 1, shows that the perfluoropolyether does not alter the hydrofluoropolyether behaviour.

The mixture is centrifuged to separate the solid aluminum trifluoride and the supernatant fluid to be subjected to $^{19}$F-NMR analysis. No formation of acid type end groups is observed. The potentiometric titration does not show the presence of acidity.

Solubility Tests

Example 9

Solubility of the Component (B) of the Class (a)

Two solutions containing 10% by weight of the compound (B) of Example 1 respectively in H-Galden® ZT 180 and in HFE™-7500 were prepared. The compound is perfectly soluble in the two fluids at 20° C., at 0° C., at −15° C., at −50° C. since the composition results limpid.

The two solutions were cooled at −78° C. by means of a dry ice bath in acetone. Under these conditions the compound (VIii) is soluble in the two solutions.

Furthermore the compositions resulted limpid without showing any phase separation even after storing at temperatures of 4° C. and 20° C. for at least 4 months (shelf-life).

Example 10

Solubility of the Component (B) of the Class (b)

Two solutions at 10% by weight of the compound (B) of the Example 2 respectively in H-Galden® ZT 180 and HFE™-7500 were prepared. The compound of formula (VIIIi) results perfectly soluble in the two fluids at 20° C., at 0° C., at −15° C., at −50° C. since the composition results quite limpid.

The two solutions were cooled at −78° C. by means of a dry ice bath in acetone. Under these conditions the compound is perfectly soluble in the two solutions.

Furthermore the compositions are limpid without showing any phase separation after storing at temperatures of 4° C. and 20° C. for at least 4 months (shelf-life).

Example 11

Solubility of the Component (B) of the Class (c)

Two solutions containing 0.5% by weight of the compound of the Example 3 respectively in H-Galden® ZT 180 and HFE™-7500 were prepared. The compound (VIIIc) is perfectly soluble in HFE™-7500 at temperatures equal to or higher than 15° C., and in H-Galden® ZT 180 equal to or higher than 0° C. since the composition is limpid.

Furthermore the compositions are limpid without showing any phase separation even after storing at temperatures of 4° C. and 20° C. for at least 4 months (shelf-life).

Example 12

Solubility of the Component (B) of Class (a) in Hydrofluoropolyether Having —CH$_3$ End Groups A solution containing 10% by weight of the compound of the Example 1 was prepared in an hydrofluoropolyether (HFPE) with the following structure:

CH$_3$OCF$_2$CF$_2$OCF$_2$OCF$_2$CF$_2$OCF$_2$CF$_2$OCH$_3$, having molecular weight equal to 460 and boiling point of 179° C., and an estimated GWP of about 250 (according to the article by Wallington et al. in J. Phys. Chem. A. 2004, vol. 108, pages 1964-1972).

The compound results perfectly soluble at 20° C., at 0° C., at −15° C., at −50° C. since the composition is limpid.

The solution was cooled at −78° C. by means of a dry ice bath in acetone. Under these conditions the compound (VIii) is still completely soluble.

Furthermore the compositions are limpid without showing any phase separation even after storing at temperatures of 4° C. and 20° C. for at least 4 months (shelf-life).

Example 13

Solubility of the Component (B) of the Class (c) in Hydrofluoropolyether Having —CH$_3$ End Groups A solution containing 0.5% by weight of the compound (B) of Example 3 was prepared in the HFPE used in the Example 12.

The compound (VIIIc) results perfectly soluble at 20° C., at 0° C., at −15° C., since the composition is limpid.

Furthermore the compositions are limpid without showing any phase separation after storing at temperatures of 4° C. and 20° C. for at least 4 months (shelf-life).

The test was then repeated by replacing the hydrofluoropolyether with a perfluoropolyether having a comparable boiling point, Galden® HT 170.

At the temperature of about 20° C. the composition containing Galden® is slightly opalescent; at 0° C. the same composition shows an evident separation of the two components.

This fact confirms the non predictability of the solubility of the compound of class (B) in fluoro(poly)ethers having a similar structure at low temperatures (lower than the room temperature).

Test in the Presence of Metals

Example 14

Mixture of Hydrofluoropolyether/Compound (VIii)

50.0 grams of an hydrofluoropolyether with the following structure:

HF$_2$CO(CF$_2$O)$_m$(CF$_2$CF$_2$O)$_n$CF$_2$H, having number average molecular weight determined by $^{19}$F-NMR analysis of 1,240, m=3.49, n=7.68, are placed in a glass flask equipped with small glass balls functioning as boilers, with thermocouple for the temperature measurement and with water cooled bubble condenser, and then they are added with 0.3 g of the compound (B) of the Example 1 and with a 100Cr6 steel metal sheet (diameter 2.5 cm; thickness 0.2 cm), previously mirror polished and washed with suitable solvents, according to the standard procedure, to remove the residues.

The flask is heated by using a heating cap, until a moderate fluid reflux, resulting, under these conditions, in an internal temperature of the fluid equal to 250° C., at which it is maintained for 30 hours.

At the end of the test, 49 g of mixture corresponding to 48.7 g of residual hydrofluoropolyether are recovered (2.6 g of weight loss with respect to the initial amount).

The metal sheet recovered at the end of the test maintains the original brightness; also at microscopic level it does not show variations with respect to the original state.

The fluid subjected to $^{19}$F-NMR analysis shows an unaltered number average molecular weight with respect to the initial one and no acid type end groups are observed.

The potentiometric titration does not show the presence of acidity.

Example 15

Comparative

The Example 14 was repeated but in absence of the compound (B) of the Example 1 and of the metal sheet. At the end of the test, a weight loss of 2.8% is measured.

By $^{19}$F-NMR analysis no variation of average molecular weight and no presence of acid end groups are observed. The potentiometric titration does not show the presence of acidity (lower than the analytical limit).

It is noticed that the weight loss value of the Example 14 (test carried out in the presence of metal sheet) substantially are comparable with that of the Example 15: thus the weight loss of the Example 14 is only due to the loss by evaporation.

Example 15a

Comparative

The Example 14 was repeated but in the absence of the compound (B) of the Example 1.

At the end of the test (30 hours) 46.3 g of residual HFPE fluid are recovered (7.4% of weight loss). The metal sheet recovered at the end of the test has completely lost the original brightness and shows also at microscopic level morphological variations with respect to the original state.

The fluid subjected to $^{19}$F-NMR analysis shows a number average molecular weight equal to 1,220 and the presence of carboxylic acid type end groups is observed. The potentiometric titration shows the presence of 4.3 meq/Kg of carboxylic acid end groups (—OCF$_2$COOH) and 3.0 meq/Kg of HF.

The formation of acid end groups and the high acidity values measured together with the weight loss and the metal surface aspect at the end of the test show the product degradation due to the presence of Lewis acids generated on the metal surface, when the component (B) is not present.

Example 16

The Example 1 was repeated by carrying out the resistance test to the Lewis acids also in the presence of 4 g of 100Cr6 steel under the form of chips, in addition to aluminum trifluoride.

At the end of the test, the weight loss is substantially equal to that of Example 1. Analogously, the potentiometric titration does not show the presence of acidity.

The invention claimed is:

1. A method of using heat transfer fluids in the presence of metals and/or Lewis acids of mixtures, the method comprising the step of:
adding a heat transfer fluid in the presence of metals and/or Lewis acids of mixtures,
wherein the heat transfer fluid comprises:
component (A) hydrofluoroethers and/or hydrofluoropolyethers, liquid under environmental conditions (25° C., 1 atm) having a number average molecular weight in the range 120-5,000; and
component (B) a compound having a fluoropolyether structure comprising one or more repeating units selected from the group consisting of (CFXO), $(CF_2CF_2O)$, $(CF_2CF_2CF_2O)$, $(CF_2CF_2CF_2CF_2O)$, $(CR_5R_6CF_2CF_2O)$, $(CF(CF_3)CF_2O)$, and $(CF_2CF(CF_3)O)$, wherein X=F, $CF_3$; $R_5$ and $R_6$, equal to or different from each other, are selected from the group consisting of H, Cl, and perfluoroalkyl from 1 to 4 carbon atoms; and having end groups selected from the group consisting of pyridine, amine, aryl classes and having a number average molecular weight in the range 400-10,000.

2. The method according to claim 1, wherein the component (A) has a number average molecular weight in the range 130-2,000.

3. The method according to claim 1, wherein the hydrofluoropolyethers of component (A) comprise oxyfluoroalkylene units selected from the group consisting of —$(CF_2O)$—, —$(CF_2CF_2O)$—, and —$(CF_2(CF_2)_cO)$—, wherein c=2, 3, statistically distributed in the polymeric back-bone.

4. The method according to claim 1, wherein the hydrofluoropolyethers of component (A) have the following formula:

$$T_1O—(CF_2O)_a—(CF_2CF_2O)_b—(CF_2(CF_2)_cO)_d-T_2 \qquad (I)$$

wherein:
c is an integer equal to 2 or 3; a, b, d are integers, zero included, such that the number average molecular weight is in the above defined range; $T_1$, $T_2$, equal to or different from each other, are selected from the group consisting of —$CF_2H$, —$CF_2CF_2H$, —$CH_3$, —$C_2H_5$, and —$C_3H_7$.

5. The method according to claim 1, wherein component (A) is a compound of formula (I), wherein d=0, having structure:

$$T_1O—(CF_2CF_2O)_b—(CF_2O)_a-T_2 \qquad (II)$$

wherein:
$T_1$, $T_2$=—$CF_2H$ or $T_1$, $T_2$=—$CH_3$; a, b are as defined in formula (I).

6. The method according to claim 1, wherein the hydrofluoroethers of component (A) are selected from the group consisting of:

$$R_1—O—R_2 \qquad (III)$$

wherein $R_1$, $R_2$, equal to or different from each other, comprise together at least 3 carbon atoms and the total number of hydrogen atoms is equal at most to the number of fluorine atoms; and $$R_f—O—R_h—O—R_f' \qquad (IV)$$

wherein:
$R_f$, $R_f'$ are independently a perfluoraliphatic or fluoroaliphatic group wherein $R_f$, $R_f'$ contains at least one hydrogen atom; and
$R_h$ is independently a linear, branched or cyclic alkylene group having from 2 to 8 carbon atoms and at least 4 hydrogen atoms.

7. The method according to claim 6, wherein the compounds are selected from the group consisting of:
$CF_3CFHCF_2OC_2H_4OCF_2CFHCF_3$;
$C_3F_7OCFHCF_2OC_2H_4OCF_2CFHOC_3F_7$;
$CF_3OCFHCF_2OC_2H_4OCF_2CFHOCF_3$;
$CF_3CFHCF_2OC_3H_6OCF_2CFHCF_3$;
$CF_3OCFHCF_2OC_2H_4OCF_2CFHOCF_3$;
$C_3F_7OCFHCF_2OC_2H_4OCF_2CFHCF_3$;
$CF_3CFHCF_2OCH_2C_3F_6CH_2OCF_2CFHCF_3$;
$CF_3CF_2CF_2OCH_2CH_2CH_2OCF_2CF_2CF_3$;
$CF_3CF_2CF_2CF_2OCH_2CH_2CH_2OCF_2CF_2CF_2CF_3$;
$CF_3CF_2CF_2OCH_2CH_2OCF_2CF_2CF_3$;
$CF_3CF_2CF_2CF_2CF_2OCH_2CH_2CH_2OCF_2CF_2CF_2CF_2CF_3$;
$CF_3CF_2CF[CF(CF_3)_2]OCH_2CH_2CH_2OCF[CF(CF_3)_2]CF_2CF_3$;
$CF_3CF_2CF_2OCH_2CH_2CH_2OCF_2CF_2CF_3$;
$C_4F_9OC_3H_{60}C_4F_9$ (mixtures of inseparable isomers of n-$C_4F_9$ and i-$C_4F_9$);
$C_4F_9OC_4H_8OC_4F_9$ (mixtures of inseparable isomers of n-$C_4F_9$ and i-$C_4F_9$);
$CF_3CF_2CF_2CF_2OCH_2CH_2OCF_2CF_2CF_3$;
$CF_3CF_2CF_2CF_2OCH_2CH_2OCH_2CH_2OCF_2CF_2CF_2CF_3$;
$CF_3OCF_2CF_2CF_2OCH_2CH_2CH_2OCF_2CF_2CF_2OCF_3$; and
isomers having a structure $(C_2F_5)(CF_3CFH)CFOC_2H_4OCF$—$(CFHCF_3)(C_2F_5)$ or their mixtures.

8. The method according to claim 1, wherein component (A) is in admixture with one or more perfluoropolyethers having a number average molecular weight between 300 and 1,550 and viscosity at 20° C. lower than 20 cSt.

9. The method according to claim 8, wherein the perfluoropolyethers are liquid perfluoropolyethers having viscosity at 20° C. lower than 20 cSt and of formula:

$$T'_1O—(CF_2CF(CF_3)O)_{a'}—(CF(CF_3)O)_{b'}—(CF_2CF_2O)_{d'}—(CF_2O)_{e'}-T'_2$$

wherein:
$T'_1$, $T'_2$, equal to or different from each other, are selected from the group consisting of —$CF_2X_1$ ($X_1$=—F, —$CF_3$,) and —$C_3F_7$; a', b', d', e' are integers, zero comprised, such that the number average molecular weight of the compound (V) between 200 and 1,550; and are present in admixture with component (A) in amounts between 10% and 90% by weight with respect to the total composition.

10. The method according to claim 1, wherein the pyridine, amine, aryl end groups of component (B) are substituted.

11. The method according to claim 1, wherein the component (B) is in a class selected from the group consisting of:

$$a) T''_1—CFW_1—O—R_f—CFW_2-T''_2 \qquad (VI)$$

wherein
$T''_1$, $T''_2$, equal to or different from each other, have the following meanings:
F, $CF_3$, $C_2F_5$, $(C_2F_4)Cl$;
$CH_2$—B—Y, $CH(CF_3)O$—Y, wherein:
B=O, S;

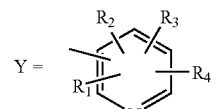

wherein $R_1$, $R_2$, $R_3$, $R_4$, equal to or different from each other, are H, F, linear or branched $C_1$-$C_8$ perfluoralkyl, $NO_2$, or CN;

with the proviso that at least one of the two end groups $T''_1$, $T''_2$ is $CH_2$—B—Y or $CH(CF_3)O$—Y;

$W_1$, $W_2$, equal to or different from each other, are —F or —$CF_3$; $R_f$ is a (per)fluoropolyoxyalkylene chain comprising one or more repeating units, statistically distributed in the chain, having the following structures: ($CFXO$), ($CF_2CF_2O$), ($CF_2CF_2CF_2O$), ($CF_2CF_2CF_2CF_2O$), ($CR_5R_6CF_2CF_2O$), ($CF(CF_3)CF_2O$), ($C_2CF(CF_3)O$), wherein X=F or $CF_3$; $R_5$ and $R_6$, equal to or different from each other, are selected from the group consisting of H, Cl, and perfluoroalkyl from 1 to 4 carbon atoms; the number average molecular weight of $R_f$ being from 400 to 10,000;

(b) $NR_1R_2$—$CF_2$—$CF_2O$—$R_fCF_2$—$CH_2NR_1R_2$ (VII)

wherein:

$R_1$, $R_2$, equal to or different from each other, are H, an alkyl chain from 1 to 12 carbon atoms, cycliphatic from 3 to 12 carbon atoms, or aryl chain containing up to 12 carbon atoms, with the proviso that $R_1$, $R_2$ are not both H; $R_F$ is a perfluoropolyoxyalkylene chain defined as $R_f$ of class (a);

(c)

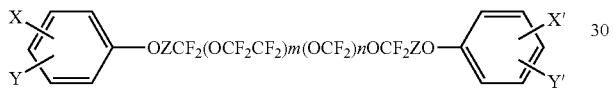
(VIII)

wherein:

X, Y, X', Y', equal or different, are independently the one from the other selected from the group consisting of H, $NO_2$, $C_1$-$C_4$ alkyl, and $C_1$-$C_4$ alkoxyl;

Z=—$CH_2$—; >C=O (carbonyl);

m and n are integers such that m is between 0 and 80, extremes included; n is between 0 and 20, extremes included; the number average molecular weight is between 500 and 10,000.

12. The method according to claim 11, wherein the (per)fluoropolyether chain $R_f$ in formula (VI) of class (a) is selected from the group consisting of:

—($CF_2CF(CF_3)O$)$_a$($CFXO$)$_b$— (i)

or

—($CF_2CF(CF_3)O$)$_a$($CFXO$)$_b$$CF_2$($R'_f$)$CF_2O$($CF_2CF$($CF_3$)$O$)$_a$($CFXO$)$_b$— wherein $R'_f$ is a perfluoroalkylene group from 1 to 4 C atoms; X is F or $CF_3$; a and b are integers, zero included, such that the number average molecular weight is in the above range, with the proviso that at least one of a or b index is different from zero;

—($CF_2CF_2O$)$_c$($CF_2O$)$_d$($CF_2$)($CF_2$)$_z$$O$)$_h$— (ii)

wherein c, d and h are integers, zero included, such that the number average molecular weight is in the above range, with the proviso that at least one of c, d, h indexes is different from zero; z is an integer equal to 2 or 3;

—($C_2CF(CF_3)O$)$_e$($CF_2CF_2O$)$_f$($CFXO$)$_g$— (iii)

wherein X is F or $CF_3$; e, f, g are integers, zero comprised, such that the number average molecular weight is in the above range, with the proviso that at least one of e, f, g indexes is different from zero;

—($CF_2$($CF_2$)$_z$$O$)$_s$— (iv)

wherein s is an integer such as to give the above molecular weight, z has the already defined meaning;

—($CR_5R_6CF_2CF_2O$)$_{j'}$— (v)

or

—($CR_5R_6CF_2CF_2O$)$_{p'}$—$R'_f$—O—($CR_5R_6CF_2CF_2O$)$_{q'}$— wherein $R_5$ and $R_6$ are equal to or different from each other and are H, Cl or perfluoroalkyl from 1 to 4 C atom; $R'_f$ is a fluoroalkylene group from 1 to 4 C atoms; j', p' and q' are integers such as to have a molecular weight as that mentioned above; and —($CF(CF_3)CF_2O$)$_j$ (vi)

or

—($CF(CF_3)CF_2O$)$_k$—$R'_f$—O—($CF(CF_3)CF_2O$)$_{j''}$ wherein $R'_f$ is a fluoroalkylene group from 1 to 4 C atoms; j, k, j" being integers such as to give the above molecular weight.

13. The method according to claim 12, wherein the perfluoropolyether structures $R_f$ in formula (VI) of class (a) are selected from (i) and (ii).

14. The method according to claim 12, wherein the formula (VI) compounds of class (a) have the (per)fluoropolyether chains linked by an ether bond to the carbon atom in alpha position with respect to the nitrogen atom of the pyridine ring Y.

15. The method according to claim 11, wherein the compound of class (a) has formula (Viii)

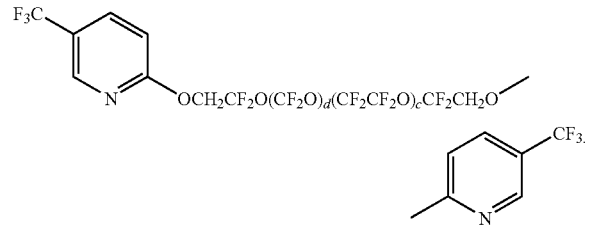

16. The method according to claim 11, wherein the compounds of class (b) having tertiary amine end groups are those having wherein $R_1$, $R_2$=$C_1$-$C_6$ aliphatic groups.

17. The method according to claim 11, wherein the class (c) compounds have formula (VIIIc)

wherein m is an integer between 0 and 80, extremes included; n is an integer between 0 and 20, extremes included, and m+n is such to give the above mentioned molecular weight, n being different from zero.

18. The method according to claim 1, wherein component (B) is selected between the classes (a), (b).

19. The method according to claim 1, wherein as component (B) compounds of class (c) are used and as component (A) hydrofluoropolyethers having terminal end groups selected from —$CH_3$ and —$C_2H_5$ are used.

20. The method according to claim 1, wherein component (B) ranges up to 30% by weight, with respect to the total composition.

* * * * *